United States Patent [19]

Vance

[11] Patent Number: 5,505,509
[45] Date of Patent: Apr. 9, 1996

[54] COMPACT DISK HANDLING DEVICE

[76] Inventor: Dean W. Vance, 2411 Woolmarket St., Gulfport, Miss. 39503

[21] Appl. No.: 222,476

[22] Filed: Apr. 4, 1994

[51] Int. Cl.$^6$ .................................................. B25J 15/00
[52] U.S. Cl. ....................................... 294/16; 294/103.1
[58] Field of Search ................................. 294/6, 15, 16, 294/26, 27.1, 32, 34, 64.1, 93–97, 99.1, 103.1, 158; 29/758, 764

[56] References Cited

U.S. PATENT DOCUMENTS

| | | | |
|---|---|---|---|
| 2,723,877 | 11/1955 | Palmour et al. | 294/16 X |
| 3,219,375 | 11/1965 | Van Pelt | 294/16 |
| 3,282,589 | 11/1966 | Morrison | 294/16 X |
| 3,903,576 | 9/1975 | Stein | 294/15 X |
| 3,961,819 | 6/1976 | Yocum | 294/6 |
| 4,417,757 | 11/1983 | Morrison | 294/26 |
| 4,604,796 | 8/1986 | Tsipenyuk et al. | 294/15 X |
| 4,653,038 | 3/1987 | Boudreaux | 294/27.1 X |
| 4,662,667 | 5/1987 | Gilligan et al. | 294/16 |
| 4,726,615 | 2/1988 | Goldberg | 294/16 |
| 4,997,224 | 3/1991 | Pierce | 294/16 |
| 5,110,167 | 5/1992 | Friend | 294/16 |
| 5,192,106 | 3/1993 | Kaufman | 294/16 |
| 5,195,794 | 3/1993 | Hummel et al. | 294/94 |
| 5,201,913 | 4/1993 | Vliet | 294/64.1 |

*Primary Examiner*—Johnny D. Cherry
*Attorney, Agent, or Firm*—Pravel, Hewitt, Kimball & Krieger

[57] ABSTRACT

An apparatus for grasping and moving Compact Disks (CDs) has a spindle catch for gripping the center hole of the CD. The spindle catch moves in and out with respect to the body of the apparatus; this movement is perpendicular to the surface of the CD. The CD handler holds the CD by gripping the center hole with the spindle catch, which is then retracted, pulling the CD into and holding the CD against a soft curved cup which supports the edges of the CD without contacting the surface of the disc.

4 Claims, 3 Drawing Sheets

COMPACT DISK HANDLING DEVICE

BACKGROUND OF THE INVENTION

This invention pertains to the field of devices for handling and moving compact disks. A compact disk (CD) is a relatively small thin disk which holds information in the form of a fine optically sensed pattern within a plastic cover. The disk has a central hole, and is very sensitive to dirt, dust and scratches. Merely touching the disk on the optical side will leave a skin oil residue which will interfere with the optical pick up and play back mechanism, shortening the usable life of the disk. While the disk is not so fragile as a phonograph record, it is more sensitive to dirt contamination and surface scratching.

Compact disks are shipped in plastic carriers which grip the disk by a central grip, a plurality of flexible fingers which hook the central hole of the disk. When the disk is placed in a play back device, it is difficult to grasp or remove, as it should only be gripped by its edges, and these are often recessed into a disk carrier or carousel. Devices have been developed to handle disc shaped items; these prior art devices include:

U.S. Pat. No. 4,417,757 to Morrison shows a hand held record handling tool which has a moveable center spindle which grips the record through the center hole, and holds the record against an edge grip. This tool must be designed for the specific size of the disc being handled.

U.S. Pat. No. 3,282,589 to Morrison shows an earlier record handler which uses a fixed spindle and a spring loaded edge grip to hold a record.

U.S. Pat. No. 5,110,167 to Friend shows a gripper which holds a CD by its edges between two opposed spring loaded gripper arms. No attempt is made to engage the center hole.

U.S. Pat. No. 5,192,106 to Kaufman identifies the CD and the problem presented by the spring loaded center hole spindle in the standard DC storage box. The disclosed invention is a spring loaded tong having both grooved inner ends for gripping the edge of the CD, and/or semi-circular outer grooves on its ends for gripping the DC by its center hole. This instrument specifically addresses the problem of disengaging the CD from the storage box center spindle.

U.S. Pat. No. 4,997,224 to Pierce discloses a tool for removing a CD from its storage box by gripping the DC by its edge, while a central protrusion on the tool presses down on the box spindle.

U.S. Pat. No. 3,961,819 to Yocum shows a record holder comprising a semi-circular grooved arm which engages about half the edge of a record. This unit could not be used for a standard CD as it is specifically design to remove or insert a record into a slip cover jacket.

U.S. Pat. No. 3,219,375 to Van Pelt shows a wire frame record grip for inserting records into or removing them from slip covers. This unit grips at two opposing points on the record edge, and can tilt to lift a record.

U.S. Pat. No. 2,723,877 to Palmour et al is a record handler which also grips a record by the edge, but does so by pinching the record edge between top and bottom jaws, rather than by applying pressure radially inward at opposing points of the edge.

SUMMARY OF THE INVENTION

The invention is a CD handler: an apparatus for grasping and moving Compact Disks (CDs). The inventive apparatus has a soft padded spindle catch for gripping the center hole of the CD. The spindle catch moves in and out with respect to the body of the apparatus; this movement is perpendicular to the surface of the CD. The CD handler holds the CD by gripping the center hole with the spindle catch, which is then retracted, pulling the CD into and holding the CD against a soft curved cup which supports the edges of the CD without contacting the surface of the disc. For ease of positioning, the invention may be formed with a pistol grip handle, and the spindle would then be manipulated by a squeeze trigger on the pistol grip.

The device permits the user to extend the spindle by squeezing the trigger; the extended spindle is then inserted into the disk hole, which is usually exposed in most play back apparatus. When the trigger is released, the spindle end grips the edge of the CD hole, pulling the CD against the body of the apparatus. A large domed soft plastic cup is mounted on the body around the spindle, and the pull of the spindle pulls the CD against this dome. Since the dome is cupped, only the edge of the dome touches the CD. Since the dome is soft, it gives slightly, and thus exerts an even resistive pressure against the entire circumference of the disk without touching either face of the disk.

As a result, a user can easily grip and move a CD without touching either face of the CD and without fumbling or dropping the CD. The invention thus makes it significantly easier to manipulate CDs.

It is an object of the invention to disclose an apparatus which easily manipulates a CD without danger of scratching or marring the surfaces of the CD.

It is a further object of the invention to disclose an apparatus for manipulating a CD which permits a person to grasp and move a CD with one hand.

It is a further object of the invention to show a device for manipulating CDs which is particularly suited to handicapped persons, or persons lacking full use of both hands.

It is a further object of the invention to disclose an apparatus which grips a CD without touching or gripping either optical face surface.

These and other objects and advantages of the invention will be apparent from the detailed description of a preferred embodiment below.

DETAILED DESCRIPTION OF THE INVENTION

Figure 1:
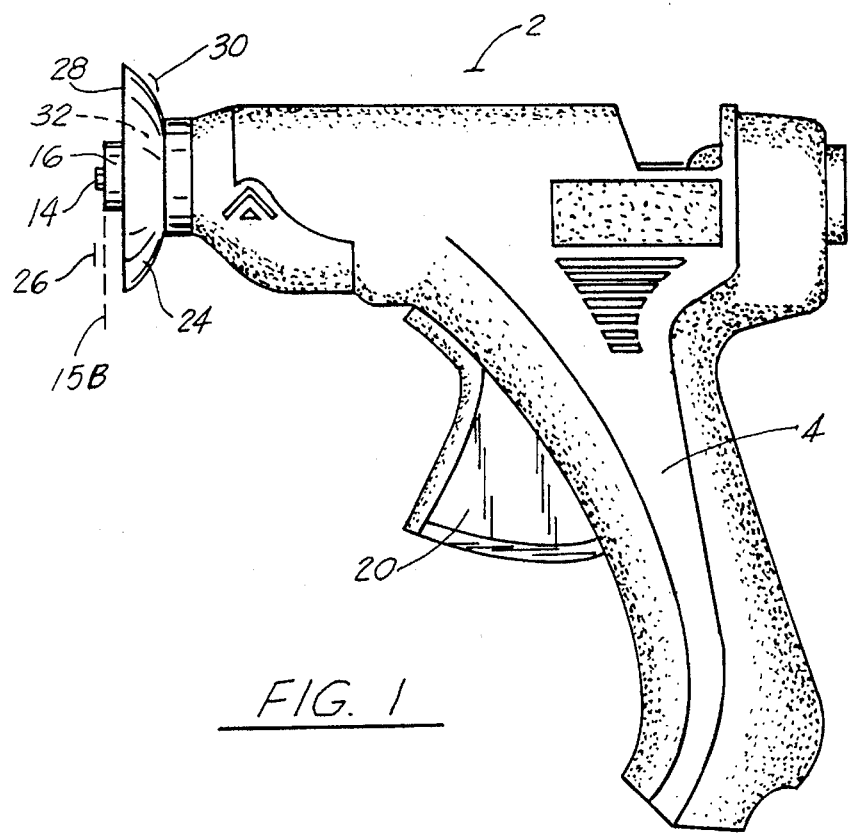
FIG. 1 is a side view of an embodiment of the invention.

In FIG. 1, I show a view of one embodiment of the inventive CD handling apparatus 2. The handling apparatus 2 is designed for manual manipulation and, therefore, is provided with a handle 4, in this embodiment in the form of a pistol grip or, in the embodiment shown in FIG. 6, in the form of a straight cylinder which may be easily grasped. Handle 4 places the apparatus 2 in the vicinity of a compact disk (CD) 6. All such CDs 6 are in the form of plastic encased, optically sensitive recording surfaces, having an outer edge 8, two faces 10 which are sensitive to contamination, dust, scratches and the like because of their necessity that they be optically transparent, and a central hole 12.

The inventive apparatus 2 provides a ready method of grasping and manipulating a CD 6 by its central hole 12 by means of an extensible spindle 14 which extends between a forward position 15A and a rearward position 15B. This motion is against the resistance of a spindle bias spring 22 which is installed within handle 4 so as to hold spindle 14 in a desired position, most typically in rearward position 15B. It is, of course, apparent how the spring may be biased so as to hold the spindle in forward position 15A providing a reverse operation of the CD handler 2 where it is desired to have some sensory or touch feedback of the strength with which the central hole 12 of the CD 6 is grasped.

At the outer end of spindle 14 is a spindle-padded end cap 16, in the form of an extension around the outer diameter of the spindle. Spindle-padded end cap 16 should be of a resilient soft, non-marking material such as a flexible plastic or a clear, non-marking vinyl or rubber composite. It is desirable that the material with which spindle end cap 16 is made or coated not leave any optically sensing marks or mars on the face 10 of the CD6.

Figure 2:
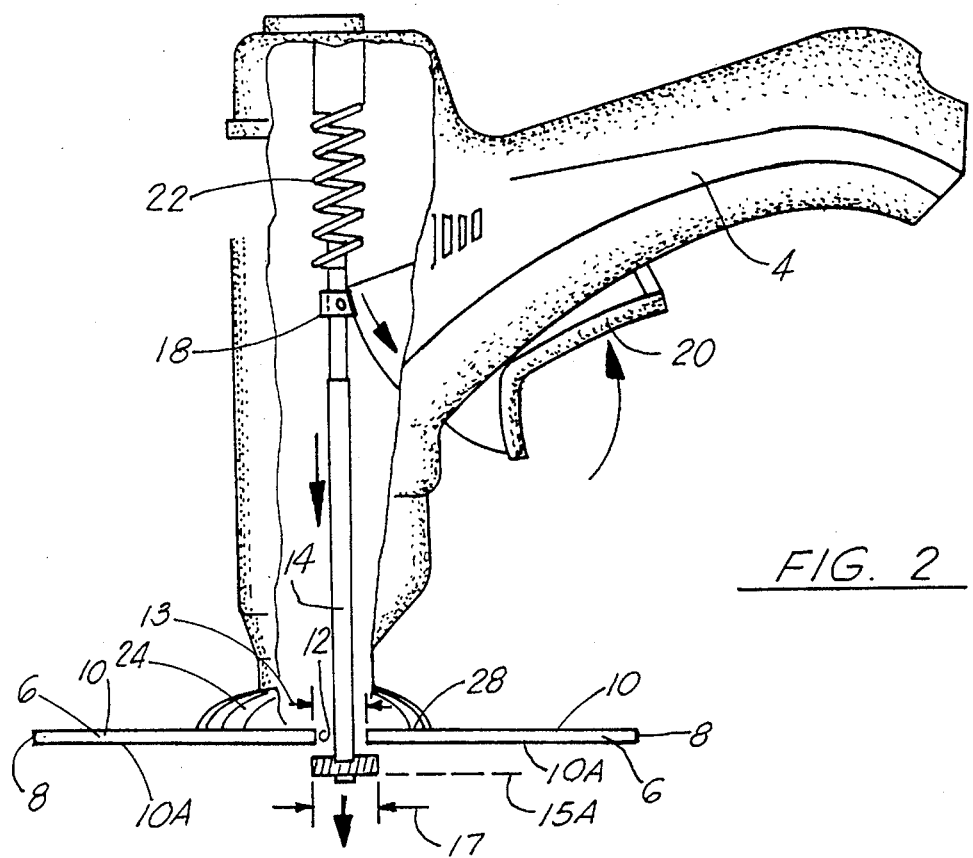
FIG. 2 is a side view of the invention being engaged with a CD.
Figure 3:
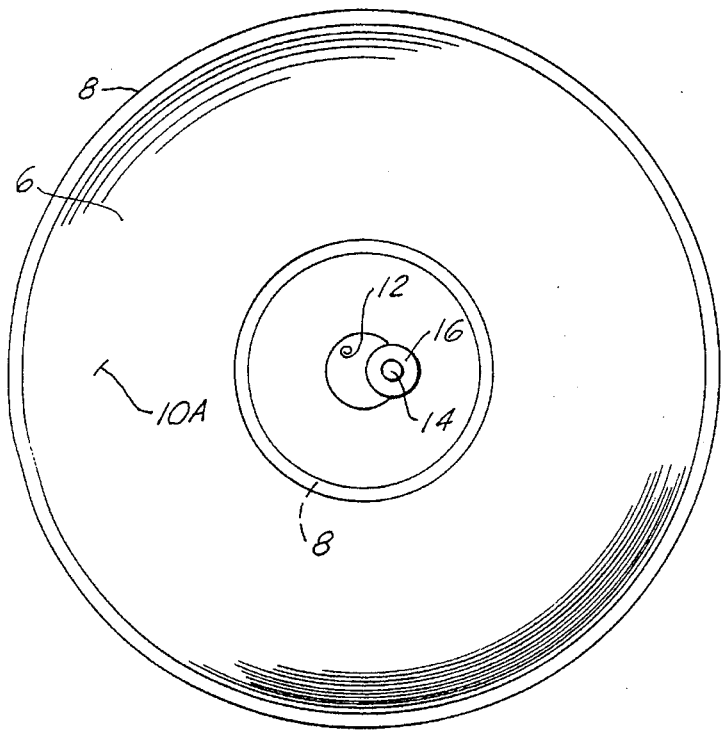
FIG. 3 is a view of the face of a CD showing engagement with the spindle of the invention.
Figure 4:
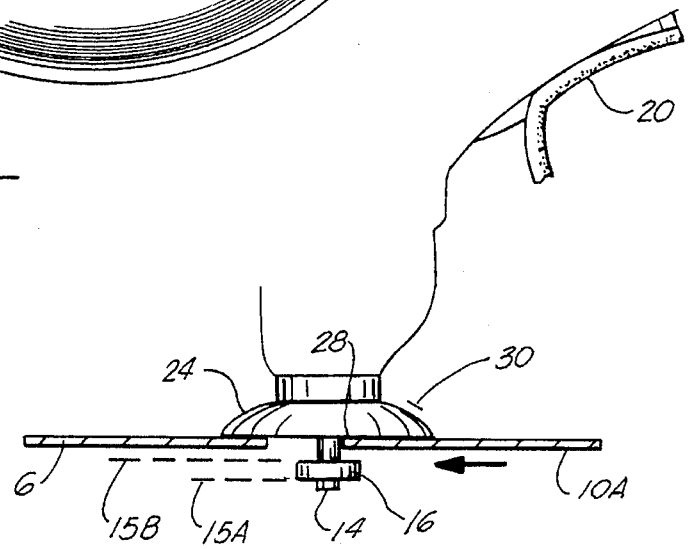
FIG. 4 is a detail of the engagement of the invention with a CD.
Figure 5:
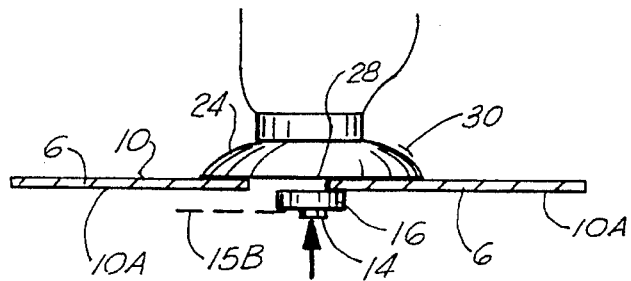
FIG. 5 is a detail of the invention grasping a CD.
Figure 6:
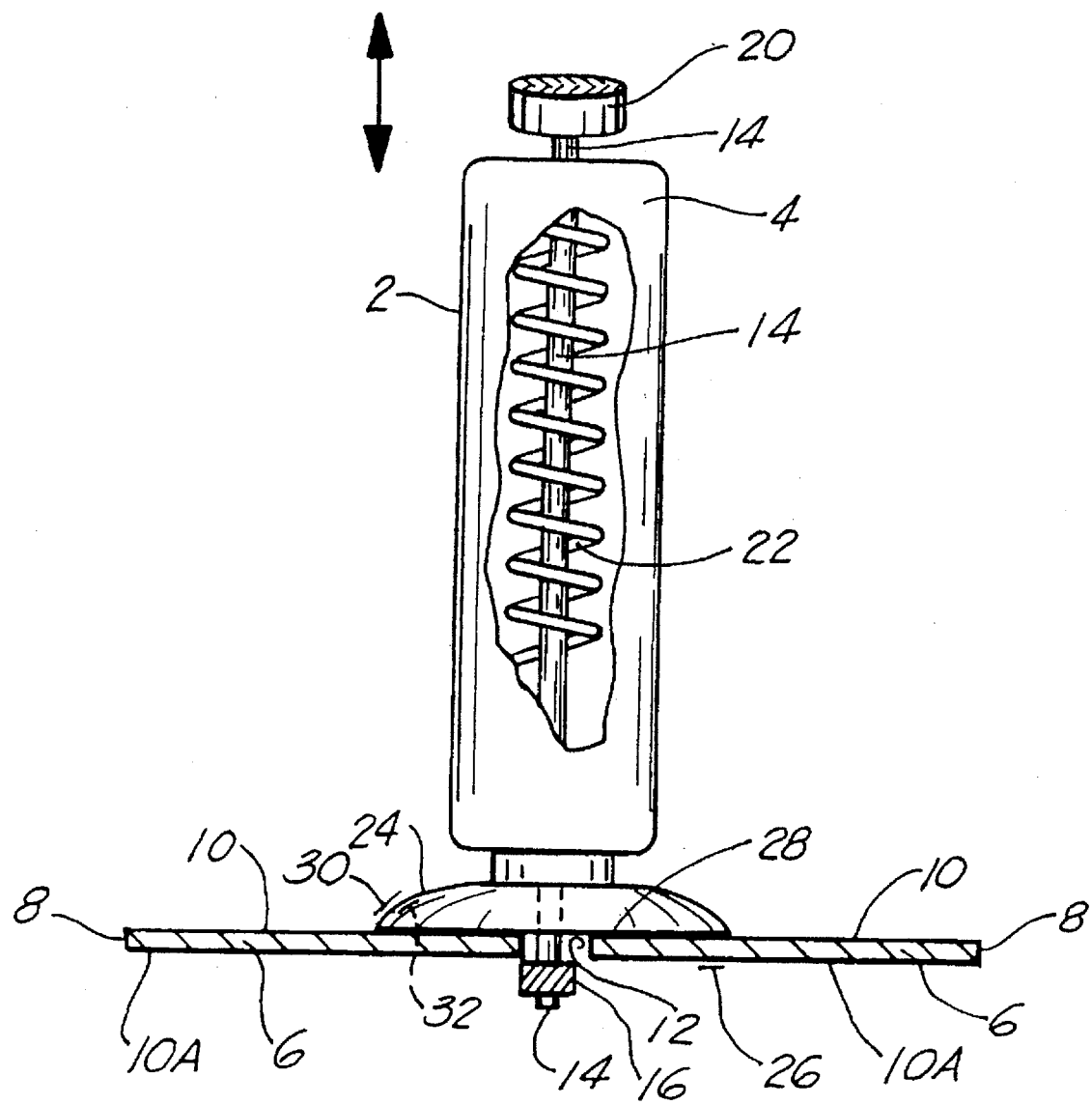
FIG. 6 is a view of an alternate embodiment of the handle of the invention.

A trigger 20 which can be in the form of a standard finger-grasped trigger in the case of a CD handle 4 in the form of a pistol grip as shown in FIGS. 1 and 2, or which may be a thumb or finger push button as shown in FIG. 6 for an in-line CD handle 4 is used to depress or move the spindle 14 between forward position 15A and rearward position 15B against the force of a spindle by a spring 22. Trigger 20 may be linked to spindle 18 by means of a pivoting link 18, or alternatively, trigger 20 as shown in FIG. 6 may be directly mounted on the end of spindle 14 away from the spindle-padded end cap 16.

In either case, manipulation of the trigger 20 moves the spindle 14 against the force of the spindle bias spring 22 so as to extend or retract the spindle 14 from the front of the handle 4 of the CD manipulating apparatus 2.

On the front 26 of the handle 4 of the invention is mounted a soft, flexible cup 24 preferably of a non-marring plastic or vinyl. A transparent vinyl suction cup of large size has been found suitable, but any flexible, non-marring vinyl or plastic including any clear latex is suitable for forming the cup 24. Cup 24 should have a curved face 30 open in the direction of the front 26 of the handle 4 ending in a uniform rim 28 which marks the outer forward portion of the cup. The curved face 30 of the cup 24 creates a space between the cup 24 and the face 10 of the CD 6 which prevents any other portion of the cup 24 or handle 4 touching the CD 6 even when spindle 14 is retracted.

Cup 24 does not necessarily have to be curved as shown in the drawings so long as it has an inverted spaced inner surface 32 so that only the rim 28 bears against the face 10 of a CD even when the cup 24 is slightly deformed by the pressure of gripping the CD 6.

In use, the spindle-padded end cap 16, which is designed to have a diameter 17 less than the diameter of the CD central hole 12 is easily passed through CD central hole 12. Manipulation of trigger 20 then extends spindle 14 to its forward position 15A and by manipulation of the handle 4 the apparatus 2 is moved to a side so that an edge of the central hole 12 can be gripped between the padded end cap 16 and the rim 28 of the cup 24.

In the preferred embodiment of the invention, the spindle-bias spring 22 is set so as to bias the spindle to the rearward position 15B upon release of the trigger. In this embodiment, releasing the trigger 20 causes the hole 12 of the CD and, thus, the CD itself to be gripped between the spindle-padded end cap 16 and the rim 28 of the cup by the force of the bias spring 22. Manipulation of the handle which is essentially perpendicular to the CD 6 at this time allows the CD 6 to be easily picked up and moved to a convenient location. As the normal manipulation of the CD 6 is from or to a playing apparatus (not shown) and in as much in all playing apparatus the carousel which contains a CD does not engage the center hole 12 of the CD, but rather has a recess which encloses the edge 8 of the CD, this is a particularly convenient method of grasping and moving a CD to and from a player.

It may be desirable to grip the CD with a controllable force. In this case, the spindle bias spring 22 is set so as to bias the spindle to the forward position 15A and manipulation of the trigger 20 retracts the spindle 14 towards the rearward position 15B. In such an embodiment, squeezing the trigger 20 allows one to judge the amount of force with which the spindle padded end cap 16 grips the central hole 12 of the CD and bears the face 10 of the CD against the rim 28 of the cup 24. Since cup 24 is flexible and soft, and since the curved cupped inner surface 32 insures that only the rim 28 will contact the face even if the cup 24 is somewhat deformed, this grip on the trigger 20 can be readily monitored to insure that the cup 24 is not excessively squeezed and a constant smooth pressure is maintained on CD 6, permitting it to be grasped and moved.

An additional advantage of the invention is that the spindle-padded end cap 16 is capable of depressing the standard fingers used in the CD caddy or "jewel case" for gripping the hole 12 of a CD in storage. Thus, the device, by depressing these fingers, makes it easy to remove the CD 6 from its case and easy to replace the CD in the case all without pulling excessively on the edge 8 of the CD as is required for manual manipulation of a CD. Inasmuch as a CD is an optical recording device, it is extremely sensitive to any marring, scratching, bending, or cracking of the face 10 and it can thus be seen that the device minimizes any chance of damage to face 10 especially to the optical playback face 10A, which in a standard CD is the face away from the labeled face of the CD and most typically is oriented towards the bottom of the CD as the CD is normally placed in a horizontal position for storage or for playback.

It can thus be seen that several embodiments of the handle 4 are possible all within the overall claimed invention of a CD manipulation device comprising an extensible spindle with small padded end cap 16 which inserts through the central hole of the CD and grasps the edge of the central hole pulling the CD against a soft, curved cup 24 of a non-marring plastic, to provide for a steady, but non-damaging pressure grip on the CD for easy movement of the CD from place to place.

It can thus be seen that the invention extends beyond the described embodiments to all apparatus within the scope of the claims.

I claim:

1. An apparatus for grasping a compact disc comprising:

a resilient cup having a central opening therein and a flexible outer rim:

a spindle extending through said opening, having a first extended position away from said cup and a second, retracted position close to said cup;

a padded end on said spindle, sized to extend through a central hole on a CD;

said padded end gripping the CD by the central hole, pulling the CD against said rim in the spindle retracted position.

2. The apparatus of claim 1 further comprising:

a handle for supporting said apparatus;

a moveable grip on said handle for moving said spindle from said first to said second position;

means for moving said spindle to said second position upon release of said grip.

3. An apparatus for grasping a CD comprising: a handle;

a resilient cup on an end of said handle, having a rim extending outwardly from said handle;

a moveable trigger in said handle, connected for movement to a spindle extending outwardly from said handle through said cup;

said spindle extending to an outward extended position in response to movement of said trigger, and retracting to an inward retracted position in response to release of said trigger;

a padded end on said spindle, sized to fit through a central hole on a CD.

4. An apparatus for grasping a CD comprising:

a handle;

a resilient cup on an end of said handle, having a rim extending outwardly from said handle;

a moveable trigger in said handle, connected for movement to a spindle extending outwardly from said handle through said cup;

said spindle retracting to an inward retracted position in response to movement of said trigger, and extending to an outward extended position in response to release of said trigger;

a padded end on said spindle, sized to fit through a central hole on a CD.

* * * * *